(12) United States Patent
Hashimoto et al.

(10) Patent No.: US 10,916,268 B2
(45) Date of Patent: *Feb. 9, 2021

(54) ALUMINUM ALLOY SUBSTRATE FOR MAGNETIC RECORDING MEDIUM AND METHOD FOR MANUFACTURING THE SAME, SUBSTRATE FOR MAGNETIC RECORDING MEDIUM, MAGNETIC RECORDING MEDIUM, AND HARD DISC DRIVE

(71) Applicant: SHOWA DENKO K.K., Tokyo (JP)

(72) Inventors: Takenori Hashimoto, Oyama (JP); Wataru Sato, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 16/249,447

(22) Filed: Jan. 16, 2019

(65) Prior Publication Data
US 2019/0228799 A1    Jul. 25, 2019

(30) Foreign Application Priority Data
Jan. 19, 2018 (JP) .................................. 2018-007499

(51) Int. Cl.
*G11B 5/848* (2006.01)
*C22C 21/02* (2006.01)
(Continued)

(52) U.S. Cl.
CPC .......... *G11B 5/70621* (2013.01); *B22F 7/062* (2013.01); *C22C 1/0416* (2013.01);
(Continued)

(58) Field of Classification Search
None
See application file for complete search history.

(56) References Cited

U.S. PATENT DOCUMENTS 4,702,885 A * 10/1987 Odani ..................... C22C 21/04
                                                          419/23
4,826,737 A * 5/1989 Yamada .................. C22C 21/06
                                                          148/522
(Continued)

FOREIGN PATENT DOCUMENTS

JP    63-183146 A    7/1988
JP    02-054408 B2   11/1990
(Continued)

OTHER PUBLICATIONS

Non-Final Office Action dated Jun. 23, 2020 in U.S. Appl. No. 16/249,126.
(Continued)

*Primary Examiner* — Kevin M Bernatz
(74) *Attorney, Agent, or Firm* — Sughrue Mion, PLLC (57) ABSTRACT

This substrate for a magnetic recording medium has a metal structure made of an Al alloy having a composition including Si in a range of 28.0% by mass to 32.0% by mass, Cu in a range of 2.5% by mass to 4.0% by mass, and Mg in a range of 0.8% by mass to 1.5% by mass with a remainder being Al, primary-crystal Si particles having a maximum diameter of 0.5 μm or more and an average particle diameter of 2 μm or less are dispersed in the metallic structure, a diameter of the substrate is in a range of 53 mm to 97 mm, and a thickness of the substrate is in a range of 0.2 mm to 0.9 mm.

12 Claims, 5 Drawing Sheets (51) Int. Cl.

| | | |
|---|---|---|
| *B22F 7/06* | (2006.01) | |
| *G11B 5/73* | (2006.01) | |
| *G11B 5/706* | (2006.01) | |
| *G11B 5/84* | (2006.01) | |
| *C22C 1/04* | (2006.01) | |
| *H01F 1/00* | (2006.01) | |
| *B22F 3/20* | (2006.01) | |
| *B22F 1/00* | (2006.01) | |
| *B22F 9/08* | (2006.01) | |

(52) U.S. Cl.
CPC .......... *C22C 21/02* (2013.01); *G11B 5/73919* (2019.05); *G11B 5/8404* (2013.01); *G11B 5/848* (2013.01); *H01F 1/00* (2013.01); *B22F 1/0011* (2013.01); *B22F 3/20* (2013.01); *B22F 9/082* (2013.01); *B22F 2301/052* (2013.01); *B22F 2304/10* (2013.01); *B22F 2998/10* (2013.01)

(56) References Cited

U.S. PATENT DOCUMENTS

| | | | | |
|---|---|---|---|---|
| 5,545,487 | A * | 8/1996 | Ishijima | C22C 1/0416 428/545 |
| 6,490,123 | B1 * | 12/2002 | Okunaga | G11B 33/142 360/99.15 |
| 9,613,648 | B2 * | 4/2017 | Kitawaki | C23C 18/1651 |
| 9,875,765 | B2 * | 1/2018 | Yukimatsu | G11B 5/7315 |
| 9,982,328 | B2 * | 5/2018 | Garat | C22C 21/02 |
| 10,573,342 | B2 * | 2/2020 | Murase | G11B 25/043 |
| 10,593,359 | B2 * | 3/2020 | Murase | G11B 5/73919 |
| 2004/0112480 | A1 * | 6/2004 | Benedictus | B64C 3/26 148/551 |
| 2008/0318081 | A1 * | 12/2008 | Steins | C25D 11/04 428/640 |
| 2015/0144227 | A1 * | 5/2015 | Kang | F02F 3/0084 148/417 |
| 2017/0327930 | A1 * | 11/2017 | Kitawaki | G11B 5/7315 |
| 2019/0228797 | A1 * | 7/2019 | Hashimoto | H01F 1/00 |
| 2019/0228798 | A1 * | 7/2019 | Hashimoto | G11B 5/848 |
| 2019/0228799 | A1 * | 7/2019 | Hashimoto | G11B 5/848 |
| 2020/0211591 | A1 * | 7/2020 | Yukimatsu | G11B 5/7353 |
| 2020/0211594 | A1 * | 7/2020 | Yukimatsu | G11B 5/7363 |
| 2020/0211595 | A1 * | 7/2020 | Yukimatsu | G11B 5/82 |

FOREIGN PATENT DOCUMENTS

| | | |
|---|---|---|
| JP | 06-145927 A | 5/1994 |
| JP | 2009-024265 A | 2/2009 |
| JP | 2015-026414 A | 2/2015 |
| JP | 2017-120680 A | 7/2017 |
| JP | 2017-155270 A | 9/2017 |
| WO | 2016/068293 A1 | 5/2016 |
| WO | WO-2016068293 A1 * | 5/2016 ............. C22C 21/00 |

OTHER PUBLICATIONS

Non-Final Office Action dated Jun. 29, 2020 in U.S. Appl. No. 16/249,238.

* cited by examiner

ALUMINUM ALLOY SUBSTRATE FOR MAGNETIC RECORDING MEDIUM AND METHOD FOR MANUFACTURING THE SAME, SUBSTRATE FOR MAGNETIC RECORDING MEDIUM, MAGNETIC RECORDING MEDIUM, AND HARD DISC DRIVE

BACKGROUND OF THE INVENTION

Field of the Invention

The present invention relates to an aluminum alloy substrate for a magnetic recording medium and a method for manufacturing the same, a substrate for a magnetic recording medium, a magnetic recording medium, and a hard disc drive.

Priority is claimed on Japanese Patent Application No. 2018-007499, filed on Jan. 19, 2018, the content of which is incorporated herein by reference.

Description of Related Art

Recently, for magnetic recording media that are used in hard disc drives, efforts have been continuously made to significantly improve the recording density. Particularly, ever since the introduction of magneto resistive (MR) head or partial response maximum likelihood (PRML) techniques, the increase in the surface recording density of magnetic recording medium has been growing more intense.

In addition, due to the recent advance of internet networks or the expansion of the use of big data, the data accumulation in data centers is also continuously increasing. In addition, due to a problem of the space in data centers, it has become necessary to increase the storage capacity per unit volume of data centers. That is, in order to increase the storage capacity per standardized hard disc drive, attempts are being made not only to increase the storage capacity per magnetic recording medium but also to increase the number of magnetic recording media stored inside a drive case.

As substrates for a magnetic recording medium, aluminum alloy substrates and glass substrates are being mainly used. Between them, aluminum alloy substrates have a higher toughness and are more easily manufactured than glass substrates and are thus being used for magnetic recording medium having a relatively large outer diameter. The thickness of an aluminum alloy substrate that is used for magnetic recording medium for 3.5-inch hard disc drives is generally 1.27 mm and thus a maximum of five magnetic recording media can be stored inside a drive case.

In order to increase the number of magnetic recording media stored inside a drive case, attempts are being made to thin substrates that are used for magnetic recording media.

However, in a case in which substrates are thinned, aluminum alloy substrates have a problem in that fluttering is more likely to occur compared with glass substrates.

Fluttering refers to the flapping of a magnetic recording medium occurring in the case of rotating the magnetic recording medium at a high speed, and, when fluttering becomes large, it becomes difficult to stably scan the magnetic information of hard disc drives.

For example, for glass substrates, the use of a material having a high specific elasticity (specific Young's modulus) as a material for a substrate for a magnetic recording medium is known to suppress fluttering (for example, refer to Japanese Unexamined Patent Application, First Publication No. 2015-26414).

In addition, a technique for alleviating fluttering by filling the inside of a drive case of a 3.5-inch hard disc drive with helium gas is known. With this technique, aluminum alloy substrates can be thinned, which makes attempts of storing six or more magnetic recording media inside the drive case in progress.

Substrates for a magnetic recording medium are generally manufactured through the following steps.

First, an aluminum alloy slab is rolled to obtain an aluminum alloy plate material having a thickness of approximately 2 mm or less, and a disc-like piece having desirable dimensions is punched out from this aluminum alloy plate material.

Next, in the punched-out aluminum alloy plate material disc, the inner and outer edges are chamfered, and data surfaces are turned. After that, in order to decrease the surface roughness or unevenness of the aluminum alloy plate material, grinding is carried out using a grinding stone, thereby producing an aluminum alloy substrate. Next, NiP-based plating is carried out on the surface of the aluminum alloy substrate in order to impart surface hardness and suppress surface defects. Next, polishing is carried out on both surfaces (data surfaces) of the aluminum alloy substrate on which NiP-based plating coats are formed.

Substrates for a magnetic recording medium are mass products and need to have a high cost performance, and thus aluminum alloys are demanded to have a high machinability and a low price.

Japanese Unexamined Patent Application, First Publication No. 2009-24265 discloses an aluminum alloy including Mg: 0.3 to 6% by mass, Si: 0.3 to 10% by mass, Zn: 0.05 to 1% by mass, and Sr: 0.001 to 0.3% by mass with a remainder being Al and impurities.

PCT International Publication No. WO2016/068293 discloses an aluminum alloy substrate for a magnetic disc containing 0.5% by mass to 24.0% by mass of Si and 0.01% by mass to 3.00% by mass of Fe with a remainder being Al and inevitable impurities.

Japanese Unexamined Patent Application, First Publication No. H6-145927 discloses a method for manufacturing an Al—Mg-based alloy rolled plate for a magnetic disc in which an Al—Mg-based alloy containing 0.1 wt % or less of Zr is continuously cast to a thin plate having a plate thickness of 4 to 10 mm, and this cast plate is cold-rolled at a strong working rate of 50% or more without being subjected to any soaking treatment and then annealed at a temperature of 300° C. to 400° C., thereby manufacturing a rolled plate in which the average crystal grain diameter in a surface layer portion is 15 µm or less. Here, the Al—Mg-based alloy contains 2.0 to 6.0 wt % of Mg and 0.01 to 0.1 wt % of either or both of Ti and B and further contains either or both of 0.03 to 0.3 wt % of Cr and 0.03 to 0.3 wt % of Mn.

In order to provide a substrate for a magnetic recording medium which has a high Young's modulus and is excellent in terms of machinability, Japanese Unexamined Patent Application, First Publication No. 2017-120680 discloses a technique in which, in the alloy structure of an aluminum alloy substrate including Mg in a range of 0.2% to 6% by mass, Si in a range of 3% to 17% by mass, Zn in a range of 0.05% to 2% by mass, and Sr in a range of 0.001% to 1% by mass, the average particle diameter of Si particles is set to 2 µm or less.

Japanese Unexamined Patent Application, First Publication No. 2017-155270 discloses a method for manufacturing powder particles using an atomization method in which an Al—Fe-based alloy, an Al—Si—Fe-based alloy, or the like is used as aluminum alloy atomized powder for an extruded material. In addition, a technique for obtaining an extruded material being excellent in terms of mechanical properties such as tensile strength by generating a crystallized substance of an intermetallic compound such as an Al—Fe-based intermetallic compound or an Al—Si—Fe-based intermetallic compound in the powder particles is described.

Japanese Examined Patent Application, Second Publication No. H2-054408 discloses a technique for obtaining an Al—Si-based alloy powder compact having an excellent notch strength by carrying out a heating treatment on a preliminary compact of Al—Si-based alloy powder at 470° C. to 500° C. and then hot-molding the preliminary compact.

Japanese Unexamined Patent Application, First Publication No. S63-183146 discloses, as a high-stiffness aluminum alloy plate for a magnetic disc substrate, an alloy plate in which ceramic particles or a fiber is dispersed in an aluminum alloy matrix in a volume ratio of 5% to 50%.

SUMMARY OF THE INVENTION

For substrates for a magnetic recording medium for a hard disc drive, there is a desire that fluttering is suppressed, that is, the width of displacement by fluttering: None Repeatable Run-Out (NRRO) is small. In addition, there is another desire that the plating property is excellent, that is, a NiP-based plating coat is uniformly formed.

In order to improve these performances, in the inventions of Japanese Unexamined Patent Application, First Publication No. 2009-24265, PCT International Publication No. WO2016/068293, Japanese Unexamined Patent Application, First Publication No. H6-145927, and Japanese Unexamined Patent Application, First Publication No. 2017-120680, the addition of a variety of elements is considered to aluminum alloy substrates is being studied.

However, according to the present inventors' studies, it is considered that, even when any of the aluminum alloys described in Japanese Unexamined Patent Application, First Publication No. 2009-24265, PCT International Publication No. WO2016/068293, Japanese Unexamined Patent Application, First Publication No. H6-145927, and Japanese Unexamined Patent Application, First Publication No. 2017-120680 is used, it is difficult to improve the plating property while suppressing fluttering as long as discs that are so thin that six or more discs can be stored in a drive case are used.

The aluminum alloys described in Japanese Unexamined Patent Application, First Publication No. 2009-24265, PCT International Publication No. WO2016/068293, Japanese Unexamined Patent Application, First Publication No. H6-145927, and Japanese Unexamined Patent Application, First Publication No. 2017-120680 are all alloys in consideration of being manufactured by casting, and, as techniques capable of manufacturing an aluminum alloy having a higher hardness or Young's modulus, attention can be paid to the aluminum alloy compacts by a powder metallurgical method, which are described in Japanese Unexamined Patent Application, First Publication No. 2017-155270, Japanese Examined Patent Application, Second Publication No. H2-054408, Japanese Unexamined Patent Application, First Publication No. S63-183146, and the like. However, the compacts by a powder metallurgical method have been actively studied for a while as described in Japanese Examined Patent Application, Second Publication No. H2-054408 or Japanese Unexamined Patent Application, First Publication No. S63-183146, but it is difficult to work the compacts to an intended shape. In addition, the compacts also have a difficulty in workability after molding and are thus, at the moment, applied only to components in a limited range of usages.

For example, in substrates for a magnetic recording medium, it is necessary to ensure the flatness of the surface of the NiP-based plating coat. However, when a large amount of Si is added in order to increase the Young's modulus in an Al—Si-based alloy, a hard Si crystallized substance is precipitated, and the Si crystallized substance causes the generation of unevenness on the surface, and thus there is a difficulty in that the formation of a flat plating coat is difficult.

The present invention has been made in consideration of the above-described circumstance, and an object of the present invention is to provide an aluminum alloy substrate for a magnetic recording medium which suppresses fluttering and also has an improved plating property while having a shape that is so thin that a larger number of aluminum alloy substrates for a magnetic recording medium can be stored than in the related art in a drive case, a method for manufacturing the same, and a substrate for a magnetic recording medium. Another object of the present invention is to provide a magnetic recording medium having the substrate for a magnetic recording medium and a hard disc drive equipped with the same.

The present inventors carried out intensive studies in order to solve the above-described problems and consequently found that an aluminum alloy substrate having a structure made of an Al alloy having a composition including Si in a range of 28.0% by mass to 32.0% by mass, Cu in a range of 2.5% by mass to 4.0% by mass, and Mg in a range of 0.8% by mass to 1.5% by mass with a remainder being Al has a high stiffness (Young's modulus) and allows the easy formation of a flat and uniform NiP-based plating coat in which defects such as fine holes are not generated even when having a diameter in a range of 53 mm to 97 mm and a thickness in a range of 0.2 mm to 0.9 mm.

In addition, the present inventors confirmed that a substrate for a magnetic recording medium obtained by forming a NiP-based plating coat on the aluminum alloy substrate has a small NRRO and is excellent in terms of the plating property even when being so thin that a larger number of substrates for a magnetic recording medium can be stored than in the related art in a drive case of a standardized hard disc drive and completed the present invention.

That is, the present invention provides the following means in order to solve the above-described problems.

(1) An aluminum alloy substrate for a magnetic recording medium according to an aspect of the present invention has a metal structure made of an Al alloy which has a composition including Si in a range of 28.0% by mass to 32.0% by mass, Cu in a range of 2.5% by mass to 4.0% by mass, and Mg in a range of 0.8% by mass to 1.5% by mass with a remainder being Al, in which primary-crystal Si particles having a maximum diameter of 0.5 μm or more and an average particle diameter of 2 μm or less are dispersed in the metallic structure, and the diameter of the substrates is in a range of 53 mm to 97 mm, and the thickness of the substrates is in a range of 0.2 mm to 0.9 mm.

(2) The Al alloy according to (1) may further include Zn in a range of 0.01% by mass to 0.5% by mass.

(3) The Al alloy according to (1) or (2) may further include one or more of Mn, Ti, Cr, V, Zr, Mo, and Co in a range of 0.01% by mass to 0.5% by mass.

(4) In the aluminum alloy substrate for a magnetic recording medium according to any one of (1) to (3), a value of E/ρ (E: Young's modulus, ρ: density) is preferably 36.5 or more.

(5) In the aluminum alloy substrate for a magnetic recording medium according to any one of (1) to (4), the metallic structure may be an extruded structure of a powder particle compact of the Al alloy.

(6) A substrate for a magnetic recording medium according to an aspect of the present invention is a substrate for a magnetic recording medium having an aluminum alloy substrate and a NiP-based plating coat formed on at least one surface of the aluminum alloy substrate, in which the aluminum alloy substrate is the aluminum alloy substrate for a magnetic recording medium according to any one of (1) to (5).

(7) A magnetic recording medium according to an aspect of the present invention is a magnetic recording medium having a substrate for a magnetic recording medium and a magnetic layer provided on a surface of the substrate for a magnetic recording medium, in which the substrate for a magnetic recording medium is the substrate for a magnetic recording medium according to (6), and the magnetic layer is provided on the surface of the aluminum alloy substrate for a magnetic recording medium on which the NiP-based plating coat is formed.

(8) A hard disc drive according to an aspect of the present invention is a hard disc drive equipped with a magnetic recording medium, in which the magnetic recording medium is the magnetic recording medium according to (7).

(9) A method for manufacturing an aluminum alloy substrate for a magnetic recording medium according to an aspect of the present invention has forming a compact of powder particles made of an Al alloy having a composition including Si in a range of 28.0% by mass to 32.0% by mass, Cu in a range of 2.5% by mass to 4.0% by mass, and Mg in a range of 0.8% by mass to 1.5% by mass with a remainder being Al, extruding this compact to form a cylindrical body, and cutting this cylindrical body to obtain a disc-shaped aluminum alloy substrate for a magnetic recording medium from the cylindrical body.

(10) In the method for manufacturing an aluminum alloy substrate for a magnetic recording medium according to (9), the Al alloy further includes Zn in a range of 0.01% by mass to 0.5% by mass.

(11) In the method for manufacturing an aluminum alloy substrate for a magnetic recording medium according to (9) or (10), the Al alloy may further include one or more of Mn, Ti, Cr, V, Zr, Mo, and Co in a range of 0.01% by mass to 0.5% by mass.

(12) In the method for manufacturing an aluminum alloy substrate for a magnetic recording medium according to any one of (9) to (11), primary-crystal Si particles having a maximum diameter of 0.5 µm or more and an average particle diameter of 2 µm or less may be dispersed.

According to the present invention, it becomes possible to provide a substrate for a magnetic recording medium which does not easily alloy the occurrence of fluttering and has an improved plating property even when having a shape that is so thin that a larger number of substrates for a magnetic recording medium can be stored in a drive case of a standardized hard disc drive than in the related art and an aluminum alloy substrate for a magnetic recording medium which can be advantageously used as a base material for the substrate for a magnetic recording medium. In addition, according to the present invention, it is possible to provide a magnetic recording medium having the substrate for a magnetic recording medium and a hard disc drive equipped with the same.

DETAILED DESCRIPTION OF THE INVENTION

Hereinafter, preferable examples of an aluminum alloy substrate for a magnetic recording medium, a substrate for a magnetic recording medium, a magnetic recording medium, and a hard disc drive according to an embodiment of the present invention will be described in detail with reference to drawings. Meanwhile, in the drawings that are used in the following description, there will be cases in which characteristic parts are illustrated in an enlarged manner for convenience in order for the easy understanding of the characteristics of the present invention, and there will be cases in which the dimensional ratios and the like of individual constituent elements are different from actual ones.

Substrate for Magnetic Recording Medium

Figure 1:
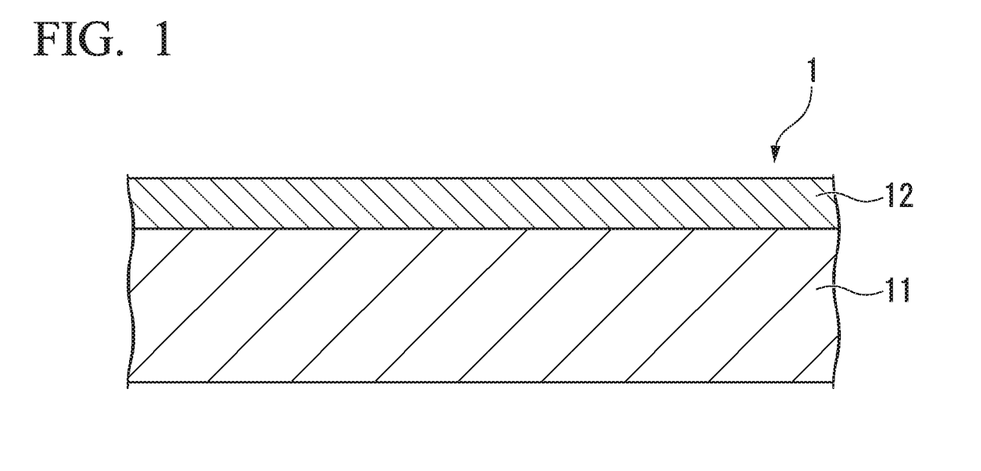
FIG. 1 is a cross-sectional schematic view illustrating an example of an aluminum alloy substrate for a magnetic recording medium in the present embodiment.

FIG. 1 is a cross-sectional view illustrating an example of a substrate for a magnetic recording medium according to the present embodiment.

As illustrated in FIG. 1, a substrate for a magnetic recording medium 1 is formed in a disc shape having an aluminum alloy substrate for a magnetic recording medium 11 and a NiP-based plating coat 12 formed on at least one surface of the aluminum alloy substrate 11.

The aluminum alloy substrate for a magnetic recording medium 11 in the present embodiment is obtained by forming a compact made of the powder particles of an Al alloy described below, forming a cylindrical body (circular column body) from this compact by extrusion, and working a disc cut out from this cylindrical body in a flat round shape.

Figure 2:
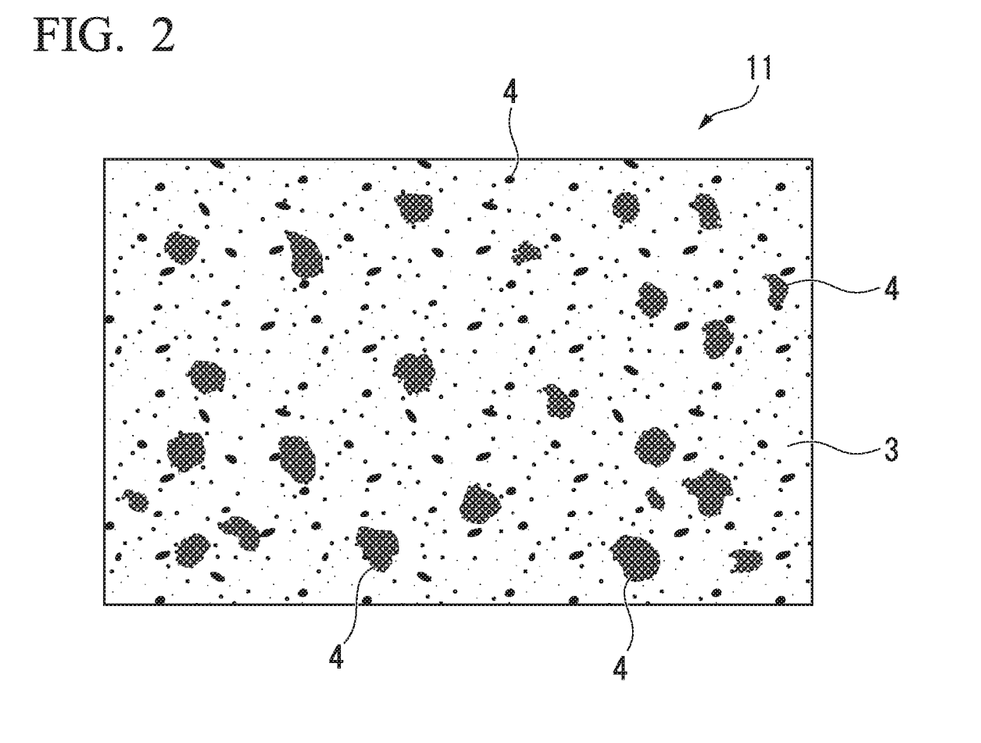
FIG. 2 is a schematic view an example of illustrating a structure of the same aluminum alloy substrate for a magnetic recording medium in an enlarged manner.
Figure 4:
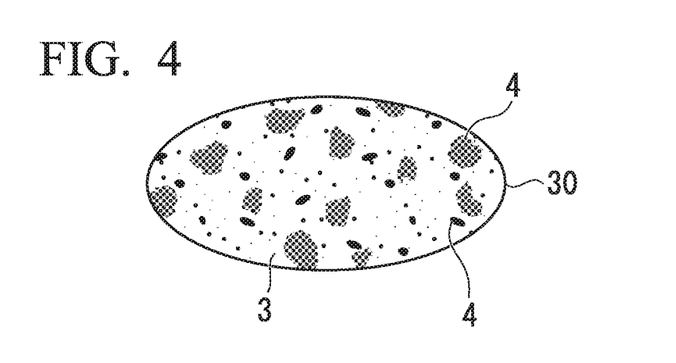
FIG. 4 is a schematic view illustrating a first example of the same alloy powder.

FIG. 2 illustrates an example of the metallic structure of the aluminum alloy substrate for a magnetic recording medium 11 and FIG. 4 illustrates an example of the metallic structure of a powder particle 30 which serves as a base of the aluminum alloy substrate for a magnetic recording medium 11. The powder particle 30 is made of powder formed using an atomization method described below, and a cylindrical body having a metallic structure illustrated in FIG. 2 can be obtained by forming a cylindrical compact (a circular column shaped body) by collecting a plurality of the powder particles 30, pressure-molding the collected powder particles, and extruding this compact.

The powder particle 30 illustrated in FIG. 4 has a metallic structure having an Al alloy matrix 3 in which Al is used as a main body and solid solutions of elements such as Si, Cu, Mg, and the like are formed in Al and primary-crystal Si particles 4 dispersed and precipitated in the Al alloy matrix 3. In addition, the metallic structure of the aluminum alloy substrate 11 obtained by extruding a compact made of these powder particles 30 has a metallic structure having the Al alloy matrix 3 in which Al is used as the main body and the solid solutions of elements such as Si, Cu, Mg, and the like are formed in Al and the primary-crystal Si particles 4 dispersed and precipitated in the Al alloy matrix 3 as illustrated in FIG. 2.

The Al alloy constituting the powder particles which serve as the base of the aluminum alloy substrate for a magnetic recording medium 11 is made of an Al alloy having a composition including Si in a range of 28.0% by mass to 32.0% by mass, Cu in a range of 2.5% by mass to 4.0% by mass, and Mg in a range of 0.8% by mass to 1.5% by mass with a remainder being Al and inevitable impurities.

In addition, the Al alloy may further include Zn in a range of 0.01% by mass to 0.5% by mass. In addition, the Al alloy may further include one or more of Mn, Ti, Cr, V, Zr, Mo, and Co in a range of 0.01% by mass to 0.5% by mass.

The inevitable impurities refer to impurities that are mixed into the Al alloy from a raw material and a manufacturing process. In the present embodiment, for example, the amount of B contained as the inevitable impurities is preferably less than 0.01% by mass. The amount of P contained as the inevitable impurities is preferably less than 0.1% by mass.

Hereinafter, the respective components of the Al alloy that is used in the present embodiment will be described.

Si: 28.0% by Mass to 32.0% by Mass

Si has an effect of improving the stiffness (Young's modulus) of the aluminum alloy substrate 11. Only a small amount of Si forms a solid solution in Al, and thus Si is dispersed and precipitated in the Al alloy structure mainly as the primary-crystal Si particles of a Si single body. When the primary-crystal Si particles are dispersed in the Al alloy structure, the stiffness (Young's modulus) of the aluminum alloy substrate 11 improves. Therefore, the Al alloy that is used in the present embodiment needs to include 28.0% by mass to 32.0% by mass of Si.

When the content of Si is less than 28.0% by mass, there is a concern that the Young's modulus may be insufficient, and, when the content of Si is an amount exceeding 32.0% by mass, there is a concern that the particle diameters of the Si particles dispersed in the Al alloy structure may become too large. Here, "the content of Si" means "the amount of Si contained in the Al alloy substrate". Hereinafter, "the content of X" means "the amount of X contained in something" in this description. The Si particles do not easily form the NiP-based plating coat, and thus, on the aluminum alloy substrate in which Si particles having an excessively large particle diameter are dispersed, there is a concern that the formation of a uniform NiP-based plating coat may be difficult. Additionally, in the aluminum alloy substrate in which Si particles having an excessively large particle diameter are dispersed, the dropping of the Si particles from the surface forms recess portions, there is a concern that it is not possible to flatten these recess portions with the NiP-based plating coat in some cases, and the flatness of the surface of the NiP-based plating coat may be insufficient.

In addition, when Si particles having an excessively large particle diameter are dispersed, there is a concern that extrusion may become difficult. Therefore, in the present embodiment, the content of Si is set in a range of 28.0% by mass to 32.0% by mass. The content of Si is more preferably in a range of 29.0% by mass to 31.5% by mass.

Cu: 2.5% by Mass to 4.0% by Mass

Cu has an effect of improving the stiffness of the aluminum alloy substrate 11 by forming a solid solution in the Al alloy matrix. In addition, Cu has an effect of further improving the stiffness of the aluminum alloy substrate 11 by forming an $Al_2Cu$ phase in the Al alloy matrix.

When the content of Cu is less than 2.5% by mass, an effect of strengthening a material at a high temperature by an aging effect disappears, and working such as hot extrusion becomes difficult. In addition, in a case in which the content of Cu is small, the amount of Cu—Si precipitated decreases, and thus Si in the Al alloy matrix substantially increases, the diameters of the primary-crystal Si particles become large, and there is a concern that the plating property may degrade.

On the other hand, when the content of Cu exceeds 4.0% by mass, the ductility and the toughness degrade, and thus there is a concern that extrusion may become difficult, and there is another concern that the density of the aluminum alloy substrate 11 may excessively increase. In substrates for a magnetic recording medium in which an aluminum alloy substrate having a high density is used, there is a tendency that NRRO becomes large, and thus it is preferable to decrease the density of the aluminum alloy substrate 11 from the viewpoint of suppressing fluttering.

Therefore, in the present embodiment, the content of Cu is set in a range of 2.5% by mass to 4.0% by mass. The content of Cu is more preferably in a range of 3.0% by mass to 3.8% by mass.

Mg: 0.8% by Mass to 1.5% by Mass

Mg has an effect of improving the mechanical strength of the aluminum alloy substrate 11 by forming a solid solution in the Al alloy matrix and suppressing the density of the aluminum alloy substrate 11.

When the content of Mg is less than 0.8% by mass, an effect of strengthening a material at a high temperature by age hardening disappears, and working such as hot extrusion becomes difficult. In addition, in a case in which the content of Mg is small, the amount of Mg—Si precipitated decreases, and thus Si in the Al alloy matrix substantially increases, the diameters of the primary-crystal Si particles become large, and there is a concern that the plating property may degrade. On the other hand, when the content of Mg exceeds 1.5% by mass, the ductility and the toughness degrade, and thus there is a concern that extrusion may become difficult.

Therefore, in the present embodiment, the content of Mg is set in a range of 0.8% by mass to 1.5% by mass. The content of Mg is more preferably in a range of 1.0% by mass to 1.4% by mass.

Zn: 0.01% by Mass to 0.5% by Mass

Zn forms a solid solution in the Al alloy matrix, bonds with other added substances, and is dispersed in the Al alloy matrix as a precipitate. In a case in which the content of Zn is less than 0.01% by mass, an effect of improving the plating property disappears. When the content of Zn exceeds 0.5% by mass, the effect is saturated, and the density becomes excessively large, and thus the content of Zn is preferably set to 0.5% by mass or less. Therefore, the content of Zn in the case of being added is preferably in a range of 0.01% by mass to 0.5% by mass. The content of Zn is more preferably in a range of 0.05% by mass to 0.3% by mass.

One or More of Mn, Ti, Cr, V, Zr, Mo, and Co: 0.01% by Mass to 0.5% by Mass

Regarding Mn, Ti, Cr, V, Zr, Mo, and Co, the aluminum alloy may contain one or more of these elements in a range of 0.01% by mass to 0.5% by mass. When the content of these elements is less than 0.01% by mass, there is no effect of improving the high-temperature strength, and an effect of improving workability in extrusion disappears. In a case in which the content of these elements exceeds 0.5% by mass, the above-described effects are saturated, and the density becomes excessively large. Therefore, the content of these elements in the case of being added is preferably in a range of 0.01% by mass to 0.5% by mass. The content of these elements is more preferably in a range of 0.05% by mass to 0.3% by mass.

Ratio E/ρ of Young's Modulus E to Density ρ: 36.5 or More

An increase in the stiffness of the aluminum alloy substrate for a magnetic recording medium 11 is one of effective methods for suppressing the fluttering of the aluminum alloy substrate for a magnetic recording medium 11 and suppressing an increase in the width of displacement (NRRO) by fluttering. Meanwhile, it is known that, in an ordinary use, NRRO also fluctuates by the density of the substrate for a magnetic recording medium in a magnetic recording medium that is rotated at an extremely fast rotation rate of 5,000 rpm or higher.

In addition, the present inventors paid attention to the Young's modulus which is one of property values that index the stiffness of a material and studied a relationship among the Young's modulus E (unit: GPa), the density ρ (unit: $g/cm^3$), and NRRO of the substrate for a magnetic recording medium. As a result, it was found that, when the ratio E/ρ of the Young's modulus E to the density is 36.5 or more, an increase in NRRO is suppressed, that is, fluttering can be suppressed.

Therefore, in the aluminum alloy substrate 11 of the present embodiment, the ratio E/ρ of the Young's modulus E to the density ρ is preferably 36.5 or more. The ratio E/ρ is more preferably 36.8 or more.

In the aluminum alloy substrate for a magnetic recording medium 11 of the present embodiment, it is more preferable that the Young's modulus E is in a range of 95 GPa to 99 GPa, the density ρ is in a range of 2.5 $g/cm^3$ to 2.7 $g/cm^3$, and the ratio E/ρ is set to 36.5 or more.

In the metallic structure of the aluminum alloy substrate for a magnetic recording medium 11 of the present embodiment, the average particle diameter of the primary-crystal Si particles is preferably set to 2 μm or less. In addition, these primary-crystal Si particles are generated in the powder particles of the Al alloy which serve as the base of the aluminum alloy substrate 11 and thus maintain almost the same particle diameters in an extruded material even when a compact is constituted of the powder particles and the extruded material is worked from the compact.

When the primary-crystal Si particles having a particle diameter of more than 2 μm are precipitated, the primary-crystal Si particles drop during surface grinding and polishing, recess portions are formed, and it is not possible to flatten the surface of the aluminum alloy substrate even when the NiP-based plating coat 12 is formed on the recess portions. Therefore, the plating coat has the recess portions on the surface, and thus the formation of a magnetic layer which will be formed later is affected, which is not desirable. In addition, it is difficult to generate a plate on the primary-crystal Si particles, and thus there is a concern that fine holes may be formed in the plating coat formed on the primary-crystal Si particles having a particle diameter of more than 2 μm.

The definition and a measurement method of the primary-crystal Si particles will be described below in detail.

NiP-Based Plating Coat

The NiP-based plating coat 12 has an effect of improving the stiffness (Young's modulus) of the substrate for a magnetic recording medium 1.

The NiP-based plating coat 12 may contain elements other than Ni and P. The NiP-based plating coat 12 is preferably formed of a NiP alloy including Ni and P or a NiWP alloy including Ni, W, and P. The NiP alloy preferably includes P in a range of 10% by mass to 15% by mass with a remainder being Ni and inevitable impurities. The NiWP alloy preferably includes W in a range of 15% by mass to 22% by mass and P in a range of 3% by mass to 10% by mass with a remainder being Ni and inevitable impurities. When the NiP-based plating coat 12 is formed of the NiP alloy or the NiWP alloy having the above-described composition, it is possible to reliably improve the stiffness of the substrate for a magnetic recording medium 1.

The thickness of the NiP-based plating coat 12 is preferably 7 μm or more and particularly preferably 9 μm or more. When the thickness of the NiP-based plating coat 12 is set to a thickness in this range, it is possible to reliably improve the stiffness of the substrate for a magnetic recording medium 1, and it is possible to absorb protrusions and recesses on the surface of the aluminum alloy substrate 11 and produce the NiP-based plating coat 12 having a flat surface.

In addition, the thickness of the NiP-based plating coat 12 is preferably 20 μm or less and particularly preferably 17 μm or less. When the thickness of the NiP-based plating coat 12 is set to a thickness in this range, it is possible to satisfy both the flatness and the lightness of the substrate for a magnetic recording medium 1.

Furthermore, the aluminum alloy substrate for a magnetic recording medium 11 of the present embodiment has a donut-like disc shape having a round hole in the center. Regarding the sizes of the aluminum alloy substrate, the diameter is in a range of 53 mm to 97 mm, and the thickness is set in a range of 0.2 mm to 0.9 mm.

Particle Diameters of Primary-Crystal Si Particles

As described above, in a substrate for a magnetic recording medium in which an aluminum alloy substrate in which the primary-crystal Si particles 4 having an excessively large particle diameter are dispersed is used, there is a concern that the plating property may degrade.

According to the present inventors' studies, it has been clarified that, in a substrate for a magnetic recording medium in which an aluminum alloy substrate in which the average particle diameter of the primary-crystal Si particles 4 exceeds 2 μm is used, there is a tendency that the plating property significantly degrades.

Therefore, in the present embodiment, the average particle diameter of the primary-crystal Si particles 4 is preferably set to 2 μm or less.

Meanwhile, the average particle diameter of the primary-crystal Si particles 4 is a value obtained from a cross-sectional image of the aluminum alloy substrate 11 using an image analysis method. As the image analysis method, more specifically, the average particle diameter of the primary-crystal Si particles is obtained by capturing a cross-sectional image of the aluminum alloy substrate using an electronic microscope such as FE-SEM and analyzing the cross-sectional image.

Next, primary-crystal Si particles having a maximum diameter of 0.5 μm or more are extracted from the obtained cross-sectional image using the image analysis method, the maximum diameters of the extracted primary-crystal Si particles are measured, and the average value of the measured maximum diameters is computed. The average particle diameter of the primary-crystal Si particles is a value obtained in the above-described manner.

Substrate Sizes: Diameter and Thickness

The aluminum alloy substrate 11 of the present embodiment is mainly used for a magnetic recording medium of a hard disc drive. Magnetic recording media need to be storable in standardized hard disc drives, that is, 2.5-inch hard disc drives, 3.5-inch hard disc drives, and the like. For example, in a 2.5-inch hard disc drive, magnetic recording media having a maximum diameter of approximately 67 mm are used, and, in a 3.5-inch hard disc drive, magnetic recording media having a maximum diameter of approximately 97 mm are used.

Therefore, in the present embodiment, the diameter of the aluminum alloy substrate is set in a range of 53 mm to 97 mm.

In addition, in hard disc drives, it is effective to increase the number of magnetic recording media that are stored in the case in order to increase the recording capacity. For example, in an ordinary 3.5-inch hard disc drive, a maximum of five magnetic recording media having a thickness of 1.27 mm are stored; however, when it is possible to store six or more magnetic recording media, it becomes possible to increase the recording capacity.

Therefore, in the present embodiment, the thickness of the aluminum alloy substrate 11 is set in a range of 0.2 mm to 0.9 mm. When the aluminum alloy substrate 11 has a thickness in this range, it becomes possible to store a larger number of magnetic recording media in the case of a hard disc drive than in the related art.

Method for Manufacturing Aluminum Alloy Substrate for Magnetic Recording Medium

The aluminum alloy substrate for a magnetic recording medium of the present embodiment can be manufactured through, for example, a step of manufacturing the powder particles of the aluminum alloy containing the above-described elements (powder particle-manufacturing step), a step of compressing the powder particles using a die or the like to mold a cylindrical body (cylindrical body-molding step), furthermore, a step of storing the cylindrical body in an extrusion device and extruding the cylindrical body to a cylindrical shape (extrusion step), a step of cutting a cylindrical body obtained by extrusion into a slice, thereby obtaining a disc (cutting step), and a step of opening a hole in the disc (hole-opening step). Meanwhile, a finishing step of carrying out the chamfering, finish polishing, or the like of the inner circumferential edges of the hole-opened portions or the disc outer circumferential edges is carried out as necessary.

Powder Particle-Manufacturing Step

In the case of manufacturing the powder particles, it is possible to use, for example, an atomization device for manufacturing the atomized powder of the aluminum alloy using a gas atomization method in which an upward nozzle is used. A specific example of this atomization device is schematically illustrated in FIG. 3.

Figure 3:
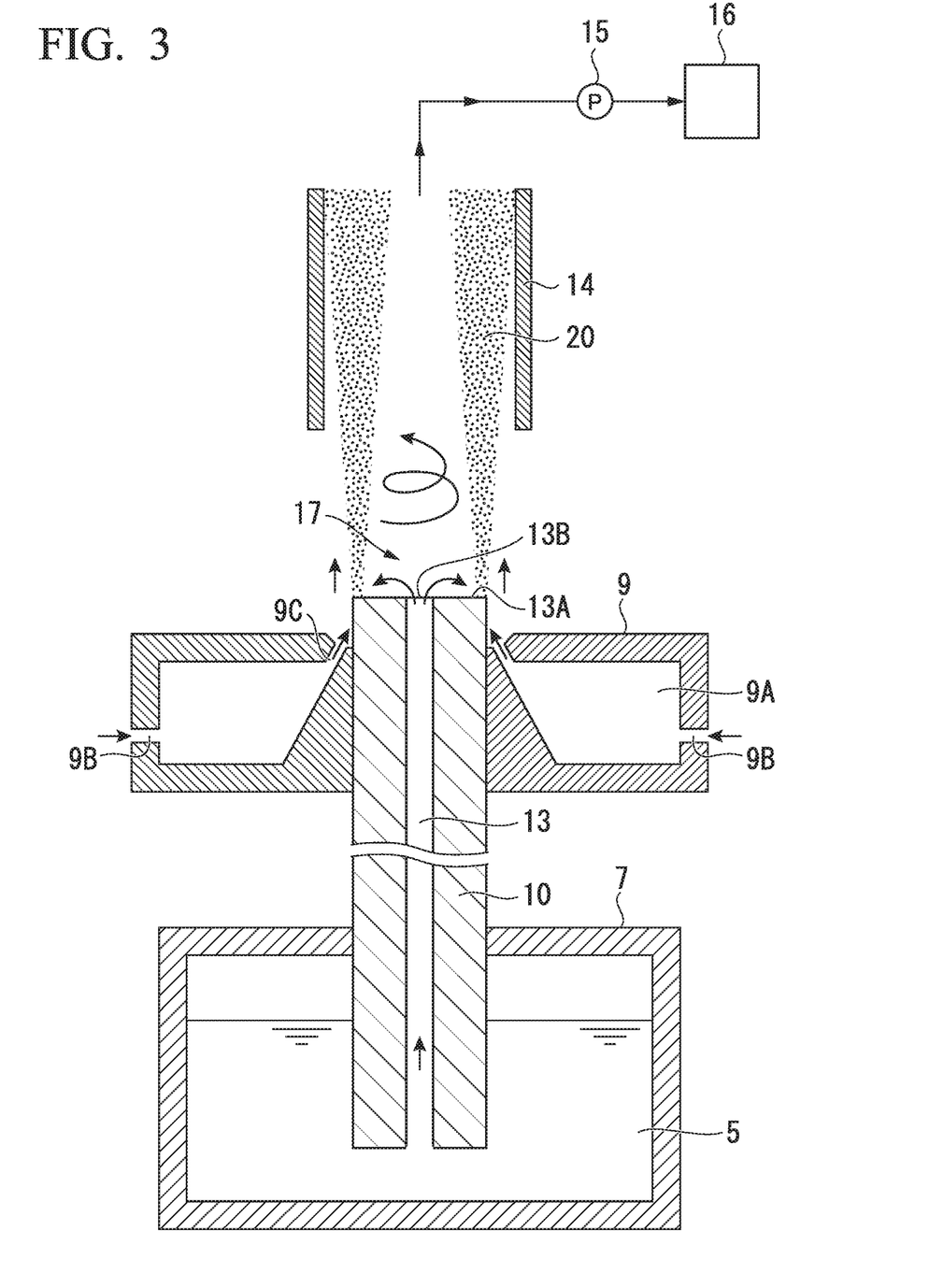
FIG. 3 is a schematic vertical cross-sectional view illustrating an example of an atomization device used to manufacture alloy powder that is used in the case of manufacturing the aluminum alloy substrate for a magnetic recording medium in the present embodiment.

In the atomization device illustrated in FIG. 3, a hollow pipe-shaped nozzle base body 13 having a molten metal flow passage 10 formed along the axis direction is installed so that the line direction lies vertically, and a lower end portion thereof is immersed in a molten aluminum alloy 5 in a molten metal retention chamber 7. An upper end surface 13A of the nozzle base body 13 lies parallel to the horizontal surface, and a molten metal discharge opening 13B at an upper end of the molten metal flow passage 10 is opened in the center of the upper end portion. On an outer circumferential side of an upper portion of the nozzle base body 13, a base body for gas spray 9 which forms a cyclic shape as a whole so as to surround the upper portion is disposed. This base body for gas spray 9 has a cyclic hollow chamber 9A formed inside, and a gas for atomization (for example, the air) is introduced to the hollow chamber 9A from the outside through a gas inflow opening 9B.

An atomization gas spray opening 9C is formed in an inside upper portion of the hollow chamber 9A, and the atomization gas is sprayed out obliquely upward from this atomization gas spray opening 9C in an oblique shape toward the upper portion outer circumferential surface of the nozzle base body 13.

Meanwhile, while not illustrated in FIG. 3, the orientation of the spray opening 9C or a direction of a gas flow path from the hollow chamber 9A through an opening end of the spray opening 9C (swiveling direction) is set so that the atomization gas that is sprayed from the atomization gas spray opening 9C swivels in predetermined direction the central axis line of the nozzle base body 13 as a criterion using.

Furthermore, at a location a predetermined distance upward away from the nozzle base body 13, a tubular body for air intake 14 having a larger diameter than the nozzle base body 13 is vertically disposed, and an upper portion of this tubular body for air intake 14 is connected to a powder collection container 16 through a pump for air intake (depressurization pump) 15.

An operation of manufacturing the aluminum alloy powder particles by the gas atomization method using the atomization device having the above-described constitution is as described below.

In a space 17 above the upper end surface 13A of the nozzle base body 13, a negative pressure is formed due to a sprayed gas flow from the atomization gas spray opening 9C and suction from the tubular body for air intake 14 side, and, due to this negative pressure, the molten aluminum alloy 5 in the molten metal retention chamber 7 is suctioned up into the molten metal flow passage 10 of the nozzle base body 13. In addition, the molten aluminum alloy is discharged from the molten metal discharge opening 13B on the upper end surface 13A of the nozzle base body 13, flows to a circumferential edge side of the upper end surface 13A, and is formed into fine liquid droplets (atomized) by the atomization gas from the atomization gas spray opening 9C in a circumferential edge portion.

In addition, these fine liquid droplets rise while swiveling. Furthermore, in this process, the solidification of the fine liquid droplets proceeds, solid powder particles are formed, and powder made of the powder particles (atomized powder) 20 rises and are stored into the powder collection container 16 through the tubular body for air intake 14 and the depressurization pump 15.

In the present embodiment, as the atomization gas from the atomization gas spray opening 9C, the air, that is, an oxidative gas is used. Therefore, the molten aluminum alloy is converted to fine liquid droplets in an oxidative atmosphere, and, since the depressurization pump 15 suctions the atmosphere (the air) from the circumference between the upper end of the nozzle base body 13 and the lower end of the tubular body for air intake 14, the solidification of the fine liquid droplets also proceeds in an oxidative atmosphere.

Figure 5:
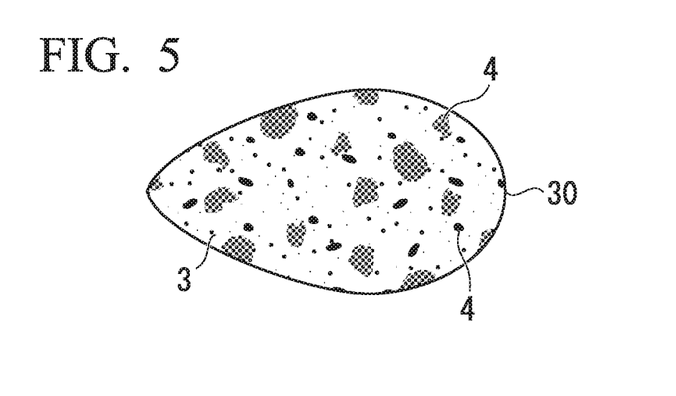
FIG. 5 is a schematic view illustrating a second example of the same alloy powder.
Figure 6:
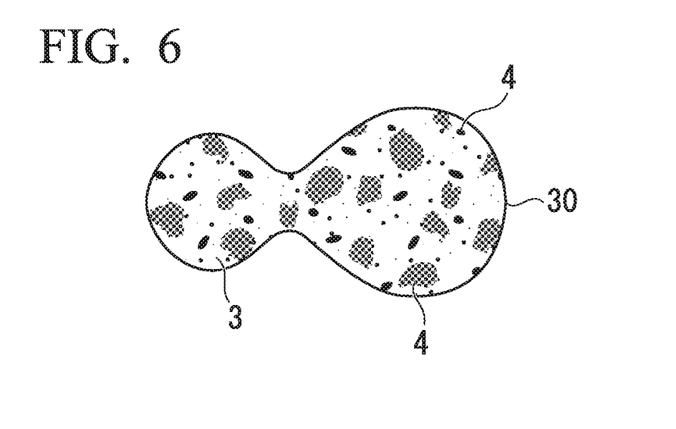
FIG. 6 is a schematic view illustrating a third example of the same alloy powder.

In the aluminum alloy atomized powder 30 of the present embodiment obtained in the above-described manner, for example, as illustrated in FIGS. 4 to 6, the overall shape of the outer form of the particle constituting the powder (powder particle) 30 forms a non-spherical shape. In addition, microscopically, a structure in which the primary-crystal Si particles 4 having an indefinite form such as a particle shape or a massive form are exposed on the surface of the powder particle 30 is formed.

Overall Shape of Powder Particle

In the aluminum alloy atomized powder of the present embodiment, as described above, the overall outer form of the particle forms a non-spherical shape. That is, the particle does not have an isotropic shape such as a sphere, has an irregular shape having a long diameter that exhibits the longest length and short diameters that are shorter than the long diameter (particle having a shape anisotropy), and, furthermore, has a shape that can be also said as a pseudo-spherical shape since the outer surface forms a substantially curved surface. Meanwhile, microscopically, the particle surface has fine protrusions and recesses imparted by the primary-crystal Si particles, but the protrusions and the recesses are fine, and thus the outer surface of the overall shape is expressed as "forming a substantially curved surface" as described above.

Typical examples of the powder particle having the above-described non-spherical shape are illustrated in FIGS. 4 to 6. FIG. 4 illustrates a powder particle 30 having a cross-sectional shape along the long diameter that forms an oval shape or an elliptical shape, FIG. 5 illustrates a teardrop-shaped powder particle 30, and FIG. 6 illustrates a guard-shaped powder particle 30. It is needless to say that the shapes illustrated here are simply typical examples of the shape, and, in actual cases, the particle often has a more complicated non-spherical shape.

Here, when the diameter in the maximum length direction of the non-spherical powder particle is considered as the long diameter, and the maximum diameter in a direction orthogonal to the long diameter direction is considered as the short diameter, the ratio of the long diameter to the short diameter, that is, the so-called aspect ratio is 1.3 or more and preferably 1.6 or more on average.

The reason for the atomized powder in the present embodiment forming a non-spherical shape as described above is not clear, but is considered as follows.

It is confirmed that, in the case of atomizing an aluminum alloy using a non-oxidative gas (a nitrogen gas or an inert gas) according to an ordinary gas atomization method of the related art, the atomized powder forms a true sphere or an almost true sphere. That is, during atomization, the molten aluminum alloy from the nozzle is split into fine liquid droplets by the atomization gas, and furthermore, the fine liquid droplets solidify while being swiveled upward by the swivel flow of the atomization gas.

In the above-described solidification process, the fine liquid droplets solidify while randomly rotating; however, at this time, when the atomization gas is non-oxidative, the oxidation of the particle surface proceeds more slowly than in a case in which an oxidative gas is used. Therefore, it is considered that, in a stage before the formation of an oxide film on the particle surface, random rotation and surface tension during free solidification act in association, and the fine liquid droplet solidifies to a true sphere or an almost true sphere.

In contrast, in the case of using an oxidative gas as the atomization gas, it is considered that, the oxidation of the liquid droplet surfaces begins at the same time as the splitting of the molten aluminum alloy from the nozzle into fine liquid droplets by the atomization gas, the rotation of the fine liquid droplets moves an oxide on the liquid droplet surfaces, the oxide impairs the free solidification, and thus the fine liquid droplets solidify to a non-spherical shape.

Meanwhile, the atomized powder that is applied in the present embodiment is not limited to powder having a non-spherical shape such as the examples illustrated in FIGS. 4 to 6, and it is needless to say that the atomized powder may be spherical or pseudo-spherical atomized powder that is manufactured using an ordinary atomization device.

The atomized powder obtained as described above is compressed in a temperature range of 250° C. to 300° C., for example, at 270° C., thereby obtaining a cylindrical powder compact having a diameter of 200 mm (cylindrical body-molding step). The size of the powder compact is not particularly limited and is set to be small enough to be stored in a container of an extrusion device being used.

Next, this cylindrical powder compact is stored in the extrusion device and extruded at 300° C. to 450° C., for example, 350° C., thereby obtaining a cylindrical extruded material having a diameter of approximately 53 mm to 97 mm and a random length (extrusion step). An outer diameter of this extruded material needs to be the same as the outer diameter of an aluminum alloy substrate for a magnetic recording medium which is the manufacturing target. Therefore, an extruded material having a diameter in a range of 53 mm to 97 mm is employed.

Meanwhile, in a state in which the compact has been formed using the above-described atomized powder, the atomized powder particles are closely bonded together, and the compact has a metallic structure in which grain boundaries of the atomized particles are present. However, in a stage in which the extruded material has been obtained, the grain boundaries of the atomized particles almost disappear, and a structure in which the primary-crystal Si particles are dispersed in the Al alloy matrix having no grain boundaries is formed.

Next, the cylindrical extruded material is cut into a flat round shape by a cutting method using a wire saw or the like, and a disc having a thickness of approximately 0.2 to 0.9 mm is produced (cutting step).

Next, a round hole is formed in the central portion of the disc using a hole-opening method such as discharging, whereby an aluminum alloy disc for a magnetic recording medium can be obtained (hole-opening step).

This aluminum alloy disc is preferably annealed at 350° C. to 400° C., for example, 380° C. for one hour.

After that, the surface and the end surface of the aluminum alloy disc are machined using a tool such as a diamond bite, whereby the aluminum alloy substrate 11 having an intended diameter and an intended thickness can be obtained. In addition, a finishing step such as finish polishing can be carried out on the substrate as necessary.

Method for Manufacturing Substrate for Magnetic Recording Medium

The substrate for magnetic recording medium 1 of the present embodiment can be manufactured using, for example, a method including a plating step of forming the NiP-based plating coat 12 on the aluminum alloy substrate 11 using a plating method and a polishing step of carrying out polishing on the surface of the NiP-based plating coat-attached aluminum alloy substrate.

Plating Step

As a method for forming the NiP-based plating coat 12 on the aluminum alloy substrate 11 in the plating step, an electroless plating method is preferably used. A plating coat made of a NiP alloy can be formed using a method that has been used in the related art. For a plating coat made of a NiWP alloy, a plating solution obtained by adding a tungsten salt to a plating solution for a NiP alloy can be used. As the tungsten salt, it is possible to use, for example, sodium tungstate, potassium tungstate, ammonium tungstate, or the like.

The thickness of the NiP-based plating coat can be adjusted using the immersion time in the plating solution and the temperature of the plating solution. Plating conditions are not particularly limited, but it is preferable to set the pH of the plating solution to 5.0 to 8.6, set the temperature of the plating solution to 70° C. to 100° C. and preferably 85° C. to 95° C., and set the immersion time in the plating solution to 90 to 150 minutes.

The obtained NiP-based plating coat-attached aluminum alloy substrate is preferably subjected to a heating treatment. In such a case, it is possible to further increase the hardness of the NiP-based plating coat and further increase the Young's modulus of the substrate for a magnetic recording medium. The temperature of the heating treatment is preferably set to 300° C. or higher.

Polishing Step

In the polishing step, the surface of the NiP-based plating coat-attached aluminum alloy substrate obtained in the plating step is polished. As the polishing step, it is preferable to employ a multistage polishing method having two or more stages of polishing steps using a plurality of independent polishing machines from the viewpoint of satisfying both the improvement of the surface quality such as a flat surface having only a small number of scratches and the improvement of the productivity. For example, a rough polishing step of polishing the surface using a first polishing machine while supplying a polishing solution including alumina abrasive grains and the washing of the polished aluminum alloy substrate are carried out, and then a finishing polishing step of polishing the surface using a second polishing machine while supplying a polishing solution including colloidal silica abrasive grains is carried out.

Figure 7:
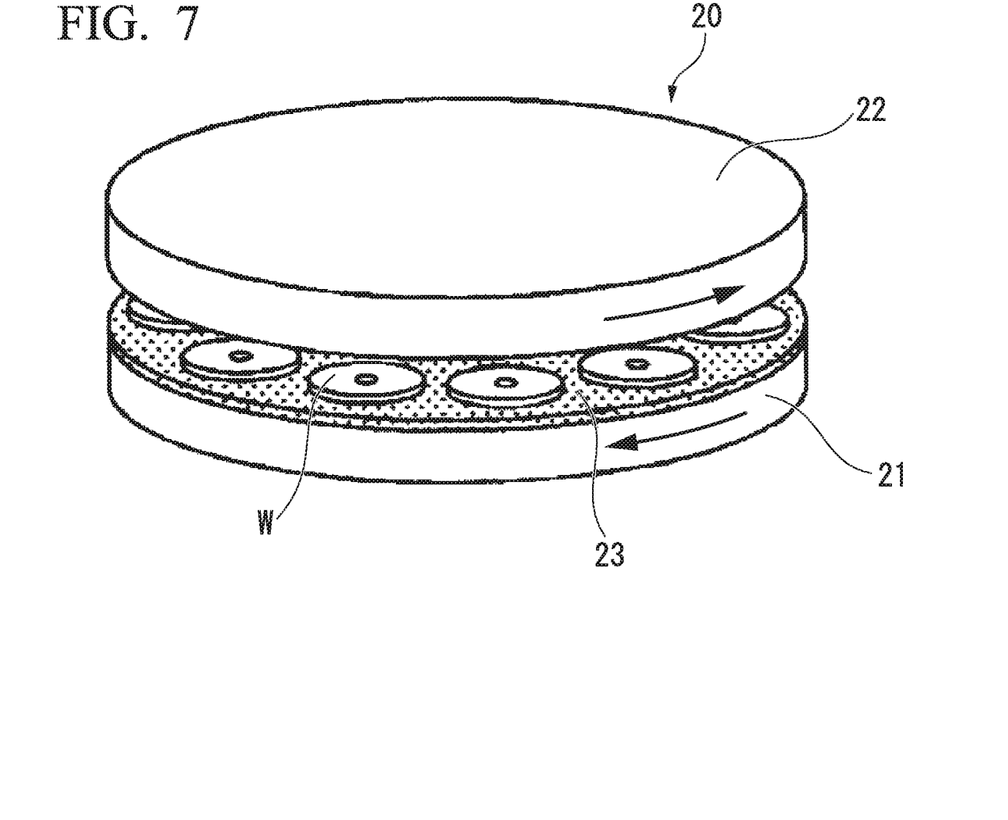
FIG. 7 is a perspective view illustrating an example of a polishing machine that can be used in the manufacturing of the substrate for a magnetic recording medium in the present embodiment.

FIG. 7 is a perspective view illustrating an example of a polishing machine that can be used in the polishing step.

As illustrated in FIG. 7, a first or second polishing machine 20 includes a pair of upper and lower press platens 21 and 22, a plurality of substrates W is sandwiched between the press platens 21 and 22 that rotate in mutually opposite directions, and both surfaces of the substrates W are polished using polishing pads 23 provided on the press platens 21 and 22.

With this polishing, the substrate for a magnetic recording medium 1 having the constitution illustrated in FIG. 1 can be obtained.

Magnetic Recording Medium

Figure 8:
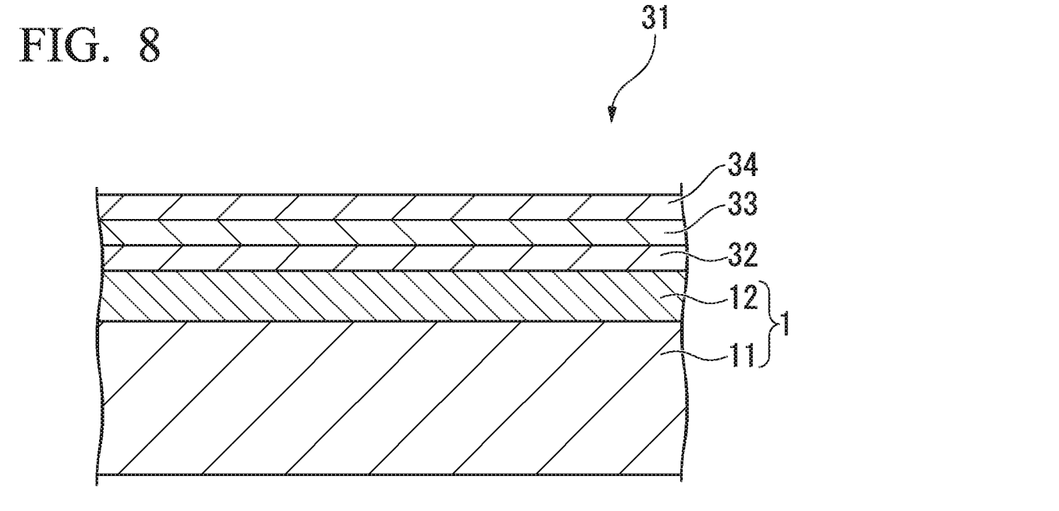
FIG. 8 is a cross-sectional schematic view illustrating an example of a magnetic recording medium in the present embodiment.

FIG. 8 is a cross-sectional schematic view illustrating an example of a magnetic recording medium in the present embodiment.

As illustrated in FIG. 8, a magnetic recording medium 31 includes the substrate for a magnetic recording medium 1 and a magnetic layer 32 provided on the surface of the NiP-based plating coat 12. On the surface of the magnetic layer 32, a protective layer 33 and a lubricant layer 34 are further laminated in this order.

The magnetic layer 32 is made of a magnetic film in which the axis of easy magnetization lies in a direction perpendicular to the substrate surface. The magnetic layer 32 includes Co and Pt and, furthermore, may include one or plural oxides, Cr, B, Cu, Ta, Zr, or the like in order to improve the SNR characteristics. As the oxide that is contained in the magnetic layer 32, $SiO_2$, SiO, $Cr_2O_3$, CoO, $Ta_2O_3$, $TiO_2$, and the like are exemplified. The magnetic layer 32 may be a single layer or may be a plurality of layers made of materials having different compositions.

The thickness of the magnetic layer 32 is preferably set to, for example, 5 to 25 nm.

The protective layer 33 is a layer that protects the magnetic layer 32. As a material of the protective layer 33, for example, carbon nitride can be used. The protective layer 33 may be a single layer or may be a plurality of layers.

The thickness of the protective layer 33 is preferably, for example, in a range of 1 nm to 10 nm.

The lubricant layer 34 is a layer that prevents the contamination of the magnetic recording medium 31 and improves the durability of the magnetic recording medium 31 by decreasing the friction force of a magnetic head of a magnetic recording device which slides on the magnetic recording medium 31. As a material of the lubricant layer 34, for example, a perfluoropolyether-based lubricant or an aliphatic hydrocarbon-based lubricant can be used.

The film thickness of the lubricant layer 34 is preferably, for example, in a range of 0.5 nm to 2 nm.

The layer constitution of the magnetic recording medium 31 in the present embodiment is not particularly limited, and it is possible to apply a well-known laminate structure. For example, in the magnetic recording medium 31, an adhesive layer (not illustrated), a soft magnetic underlayer (not illustrated), a seed layer (not illustrated), and an orientation control layer (not illustrated) may be laminated in this order between the substrate for a magnetic recording medium 1 and the magnetic layer 32.

Hard Disc Drive

Figure 9:
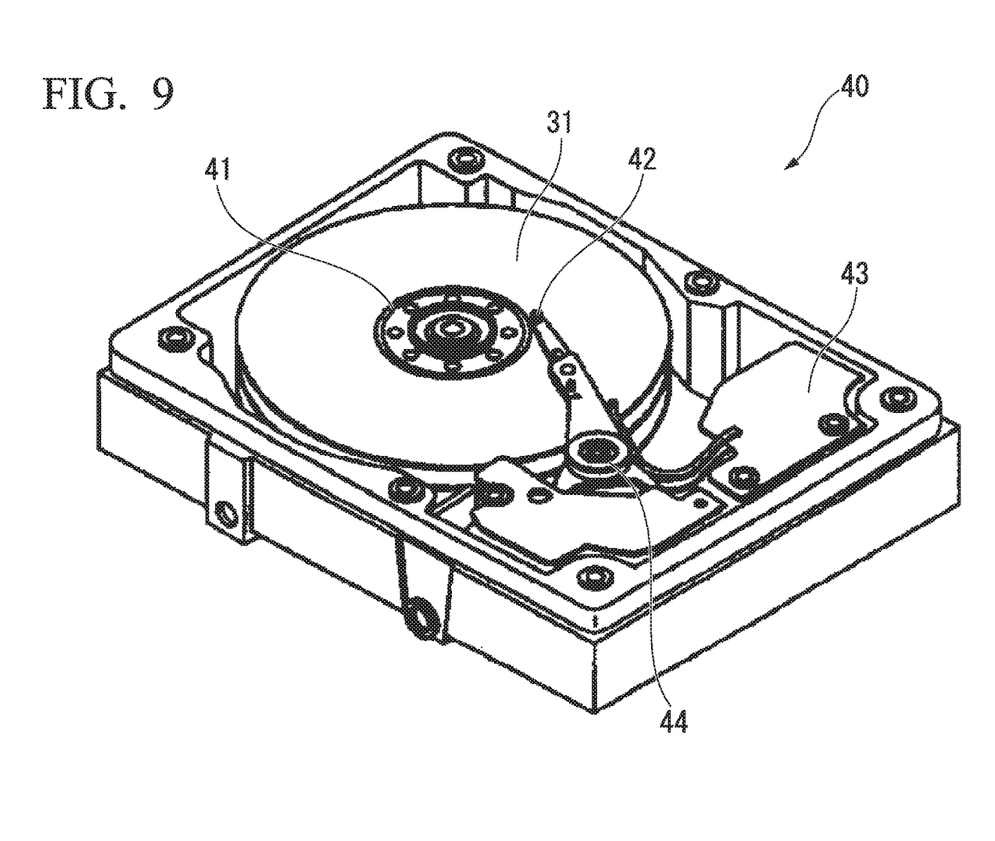
FIG. 9 is a perspective view illustrating an example of a hard disc drive in the present embodiment.

FIG. 9 is a perspective view illustrating an example of a hard disc drive in the present embodiment.

As illustrated in FIG. 9, a hard disc drive 40 is equipped with the above-described magnetic recording medium 31, a medium-driving portion 41, a magnetic head 42, a head-moving portion 43, and a record replay signal-processing portion 44.

The medium-driving portion 41 drives the magnetic recording medium 31 in a recording direction. The magnetic head 42 is made up of a recording portion and a replay portion. The head-moving portion 43 processes a record replay signal from the magnetic head 42. The record replay signal-processing portion 44 processes a record replay signal from the magnetic head 42.

The aluminum alloy substrate for a magnetic recording medium 11 can be thinned since fluttering is alleviated. Therefore, it becomes possible to provide the hard disc drive 40 having a high recording capacity by increasing the number of the magnetic recording media 31 that are stored in a standardized hard disc drive case.

In addition, when the substrate for a magnetic recording medium 1 has a high mechanical workability and can be manufactured at a low cost, it is possible to decrease the bit unit price of a hard disc drive having a high recording capacity.

In addition, the magnetic recording medium 31 having the above-described structure is capable of alleviating fluttering in the atmosphere, and thus it becomes unnecessary to encapsulate a gas having a low molecular weight such as helium in the hard disc drive case, and it is possible to reduce the manufacturing cost of the hard disc drive 40 having a high recording capacity.

In addition, the hard disc drive 40 is preferably used as, particularly, a 3.5-inch hard disc drive having a high recording capacity.

The magnetic recording medium 31 of the present embodiment which is provided with the above-described constitution has a high stiffness (Young's modulus) and facilitates the formation of a flat and uniform NiP-based plating coat only having a small number of fine holes even when having a diameter in a range of 53 mm to 97 mm and having a thickness in a range of 0.2 mm to 0.9 mm.

The magnetic recording medium 31 of the present embodiment has the above-described aluminum alloy substrate for a magnetic recording medium 11 and the NiP-based plating coat 12. Due to this constitution, even when the magnetic recording medium has a shape that is so thin so that a larger number of magnetic recording media can be stored in a drive case of a standardized hard disc drive than in the related art, the width of displacement by fluttering is small, and the plating property is excellent. This is because the aluminum alloy substrate 11 has a high stiffness and has a sufficiently high strength even when having a thin shape, there are no recess portions or the like on the surface of the plating coat 12, and there are no fine holes or the like in the plating coat 12, and thus the surface is flat.

In addition, the magnetic recording medium 31 of the present embodiment includes the magnetic layer 32 on the surface of the above-described aluminum alloy substrate for a magnetic recording medium 11 and thus can be provided with a shape that is so thin so that a larger number of magnetic recording media can be stored in a drive case of a standardized hard disc drive than in the related art.

In addition, the hard disc drive of the present embodiment is equipped with the above-described magnetic recording medium 31, and thus it is possible to store a larger number of the magnetic recording media 31 in a drive case than in the related art, whereby the recording capacity of the hard disc drive increases.

Examples

Hereinafter, the effects of the present invention will be further clarified using examples. Meanwhile, the present invention is not limited to the following examples and can be carried out with appropriate modification within the scope of the gist.

Manufacturing of Aluminum Alloy Substrate

As raw materials, metallic Al, a lump of Si, an Al—Mg alloy, and metallic Cu were prepared. Meanwhile, regarding the respective raw materials of Al, Si, and Cu, raw materials in which the content of B was less than 0.01% by mass and the content of P was less than 0.01% by mass were prepared.

The prepared raw materials of the respective elements were weighed so that the compositions became compositions shown in Table 1, and the raw materials were melt in the atmosphere, thereby obtaining molten aluminum alloys.

In examples and comparative examples shown in Table 1, atomized powders were produced from the obtained molten aluminum alloys using an upward nozzle-type gas atomization device having a constitution illustrated in FIG. 3.

As an atomization gas, the air at a normal temperature was used, and the atmosphere was also formed in the air at a normal temperature. The flow rate of the atomization gas (the air) was set to 3 $m^3$/min, and the temperature of the molten aluminum alloy was set to 1,100° C.

As a result of investigating the particle shape of the obtained atomized powder, it was confirmed that the particle shape formed a non-spherical shape having an aspect ratio of approximately 1.7 on average. In addition, it could be also confirmed that a plurality of primary-crystal Si particles was exposed on the powder particle surface. Meanwhile, the particle diameter of the obtained atomized powder was 57 μm on average.

The obtained atomized powders were compressed at 300° C. to obtain cylindrical powder compacts having a diameter of 200 mm, and these cylindrical powder compacts were stored in an extrusion device and hot-extruded at 350° C., thereby obtaining cylindrical extruded materials having a diameter of 67 mm.

Next, 0.4 mm-thick discs were cut out from the cylindrical extruded materials using a wire saw device, and round holes were formed in the central portions of the discs by discharging, thereby obtaining aluminum alloy discs for testing.

It could be confirmed by structural observation using an optical microscope that, in a state in which the compact had been formed using the atomized powder, the particles of the atomized powder were combined with together, and the compact had a metallic structure in which grain boundaries of the atomized particles were present; however, in a stage in which the extruded material had been obtained, the grain boundaries of the atomized powder particles almost disappeared, and a structure in which the primary-crystal Si particles were dispersed in a uniform matrix was formed.

This aluminum alloy discs were annealed at 380° C. for one hour. After that, the surfaces and the end surfaces of the aluminum alloy discs were machined using a diamond bite, thereby obtaining aluminum alloy substrates having a diameter of 55 mm and a thickness of 0.4 mm.

Manufacturing of Substrate for Magnetic Recording Medium

The aluminum alloy substrates were immersed in a NiP-based plating solution, and $Ni_{88}P_{12}$ (the content of P was 12% by mass, and the remainder was Ni) films were formed as NiP-based plating coats on the surfaces of the aluminum alloy substrates using an electroless plating method.

As the NiP-based plating solution, a plating solution including nickel sulfate (nickel source) and sodium hypophosphite (phosphorus source), the amounts of the components of which were adjusted by appropriately adding lead acetate, sodium citrate, and sodium borate so as to obtain a NiP-based plating coat having the above-described composition, was used. During the formation of the NiP-based plating coats, the NiP-based plating solution was adjusted to 6 in pH and 90° C. in solution temperature. The immersion time of the aluminum alloy substrates in the NiP-based plating solution was set to two hours.

Next, the aluminum alloy substrates having the NiP-based plating coat formed thereon were heated at 300° C. for three minutes, thereby obtaining NiP-based plating coat-attached aluminum alloy substrates.

Next, the surfaces of the NiP-based plating coat-attached aluminum alloy substrates were polished using, as a polishing machine, a three-stage lapping machine including a pair of upper and lower press platens, thereby producing substrates for a magnetic recording medium. At this time, as a polishing pad, a suede-type polishing pad (manufactured by Filwel Co., Ltd.) was used. In addition, in the first stage of polishing, alumina abrasive grains having D50 of 0.5 μm were used, in the second stage of polishing, colloidal silica abrasive grains having D50 of 30 nm were used, and, in the third stage of polishing, colloidal silica abrasive grains having D50 of 10 nm were used. In addition, the polishing time was set to five minutes in each stage.

Evaluation

The following items were evaluated.

Average Particle Diameter of the Coarse Particles of Primary-Crystal Si Particles The alloy structure of the aluminum alloy substrate was observed on a cross section, and the distribution density of particles in which the maximum diameter of the primary-crystal Si particles was 0.5 μm or more was measured. In addition, the average particle diameter of the primary-crystal Si particles was computed from the measured distribution density of particles in which the maximum diameter was 0.5 μm or more.

Specifically, a 10 mm×10 mm piece was cut out from the aluminum alloy substrate and embedded in a resin, thereby producing a sample. At this time, Demotec20 (manufactured by Bodson Quality Control) (powder and liquid were mixed together in a mass ratio of 2:1, normal-temperature curing type) was used as the embedding resin. Next, the sample was wet-polished to expose a cross section in a direction parallel to a rolling direction, and then the sample was etched. At this time, the sample was immersed in an aqueous solution of 2.3% by mass of hydrofluoric acid for 30 seconds at a normal temperature, removed, and then washed with flowing water for one minute, thereby etching the sample.

Here, a reflected electron image of the alloy structure of the sample after the etching was captured using JSM-7000F FE-SEM (manufactured by JEOL Ltd.). At this time, a conductive treatment was carried out on the sample in advance by carbon deposition, and the reflected electron image was captured with a magnification set to 2,000 times. This reflected electron image having a view area of 2,774 $\mu m^2$ was binarized using Win ROOF (Ver 6.5), and the maximum diameters of the primary-crystal Si particles and the distribution density of particles in which the maximum diameter was 0.5 μm or more were measured. Specifically, the threshold value was set to 200 to 255 (or 135 to 255 in a case in which binarization was not possible at this threshold value), and a binarization treatment was carried out using a discrimination analysis method. On the obtained image, a hole-filling treatment and a treatment of removing particles having a particle diameter of 0.5 μm or less were carried out, and the distribution density of the maximum diameters of the primary-crystal Si particles having a maximum diameter of 0.5 μm or more was measured. The results are shown in Table 1.

Workability

The workability of the aluminum alloy substrate during manufacturing was evaluated from the flatness by observing the surface of the aluminum alloy substrate after machining using a differential interference-type optical microscope having a magnification of 1,000 times. Meanwhile, the workability was determined as O in a case in which the flatness was excellent, as Δ in a case in which a small number of scratches were observed, but there was no practical problem, and as X in a case in which a number of scratches were observed, and a number of unavailable portions were generated. The results are shown in Table 1.

Plating Property

The aluminum alloy substrate was immersed in the NiP-based plating solution, a $Ni_{88}P_{12}$ film was formed as the NiP-based plating coat on the surface of the aluminum alloy substrate using an electroless plating method, and then the aluminum alloy substrate was heated at 300° C. for three minutes, thereby manufacturing a NiP-based plating coat-attached aluminum alloy substrate. As the formation conditions of the NiP-based plating coat, the same conditions for the manufacturing of the substrate for a magnetic recording medium were set.

The plating property was evaluated from the flatness and the presence or absence of fine holes by observing the surface of the NiP-based plating coat in the NiP-based plating coat-attached aluminum alloy substrate using a differential interference-type optical microscope having a magnification of 1,000 times. Meanwhile, the plating property was determined as O in a case in which the plating property was excellent, as Δ in a case in which the surface was available, and as X in a case in which the plating property was poor. The results are shown in Table 1.

Plating Rate

The growth rate of a film when the aluminum alloy substrate was immersed in the NiP-based plating solution and a $Ni_{88}P_{12}$ film was formed as the NiP-based plating coat on the surface of the aluminum alloy substrate using an electroless plating method was evaluated. Meanwhile, the plating rate was determined as O in a case in which the plating rate was fast enough to be applied to mass production and as X in a case in which the plating rate was poor.

Young's Modulus E, Density ρ, and Ratio E/ρ

The Young's modulus of the substrate for a magnetic recording medium was measured at a normal temperature on the basis of Japanese Industrial Standards JIS Z 2280-1993. Meanwhile, the Young's modulus was measured from a test specimen obtained by cutting out a strip-shaped piece having a length of 50 mm, a width of 10 mm, and a thickness of 0.8 mm from the substrate for a magnetic recording medium.

The density of the substrate for a magnetic recording medium was obtained using the values of the densities of constituent elements cited from publications.

In addition, the ratio E/ρ of the Young's modulus E to the density ρ was computed. The results are shown in Table 1.

Fluttering Characteristics

The fluttering characteristics were evaluated by measuring NRRO. Regarding NRRO, the substrate for a magnetic recording medium was rotated at 10,000 rpm for one minute, the width of displacement caused by fluttering occurring on the outermost circumferential surface of the substrate for a magnetic recording medium was measured using a He—Ne laser displacement meter, and the maximum value of the obtained widths of displacement was used as NRRO.

The substrate for a magnetic recording medium having NRRO of 3.2 μm or less was evaluated as A, the substrate for a magnetic recording medium having NRRO of more than 3.2 μm and 3.4 μm or less was evaluated as B, the substrate for a magnetic recording medium having NRRO of more than 3.4 μm and 3.6 μm or less was evaluated as C, and the substrate for a magnetic recording medium having NRRO of more than 3.6 μm was evaluated as D. The results are shown in Table 1.

TABLE 1

|  | Composition (% by mass) | | | | | | Average particle diameter of coarse particles | Workability |
| --- | --- | --- | --- | --- | --- | --- | --- | --- |
|  | Si | Cu | Mg | Zn | Other | Al | | |
| Example 1 | 30.0 | 3.5 | 1.2 | 0.1 | — | Remainder | 1.7 | ○ |
| Example 2 | 32.0 | 3.5 | 1.2 | 0.1 | — | Remainder | 1.8 | Δ |
| Example 3 | 28.0 | 3.5 | 1.2 | 0.1 | — | Remainder | 1.5 | Δ |
| Example 4 | 30.0 | 4.0 | 1.2 | 0.1 | — | Remainder | 1.7 | Δ |
| Example 5 | 30.0 | 2.5 | 1.2 | 0.1 | — | Remainder | 1.8 | Δ |
| Example 6 | 30.0 | 3.5 | 1.5 | 0.1 | — | Remainder | 1.7 | Δ |
| Example 7 | 30.0 | 3.5 | 0.8 | 0.1 | — | Remainder | 1.8 | Δ |
| Example 8 | 30.0 | 3.5 | 1.2 | 0.5 | — | Remainder | 1.7 | ○ |
| Example 9 | 30.0 | 3.5 | 1.2 | 0.01 | — | Remainder | 1.7 | ○ |
| Example 10 | 30.0 | 3.5 | 1.2 | 0.1 | Mn; 0.1 | Remainder | 1.7 | ○ |
| Example 11 | 30.0 | 3.5 | 1.2 | 0.1 | Ti; 0.1 | Remainder | 1.7 | ○ |
| Example 12 | 30.0 | 3.5 | 1.2 | 0.1 | Cr; 0.1 | Remainder | 1.7 | ○ |
| Example 13 | 30.0 | 3.5 | 1.2 | 0.1 | V; 0.1 | Remainder | 1.7 | ○ |
| Example 14 | 30.0 | 3.5 | 1.2 | 0.1 | Zr; 0.1 | Remainder | 1.7 | ○ |
| Example 15 | 30.0 | 3.5 | 1.2 | 0.1 | Mo; 0.1 | Remainder | 1.7 | ○ |
| Example 16 | 30.0 | 3.5 | 1.2 | 0.1 | Co; 0.1 | Remainder | 1.7 | ○ |
| Comparative Example 1 | 33.0 | 3.5 | 1.2 | 0.1 | — | Remainder | 8.0 | x |
| Comparative Example 2 | 27.0 | 3.5 | 1.2 | 0.1 | — | Remainder | 1.5 | ○ |
| Comparative Example 3 | 30.0 | 5.0 | 1.2 | 0.1 | — | Remainder | 1.6 | x |
| Comparative Example 4 | 30.0 | 2.0 | 1.2 | 0.1 | — | Remainder | 4.0 | x |
| Comparative Example 5 | 30.0 | 3.5 | 2.0 | 0.1 | — | Remainder | 1.7 | x |
| Comparative Example 6 | 30.0 | 3.5 | 0.5 | 0.1 | — | Remainder | 5.0 | x |
| Comparative Example 7 | 30.0 | 3.5 | 1.2 | 0.55 | — | Remainder | 1.7 | ○ |
| Comparative Example 8 | 30.0 | 3.5 | 1.2 | <0.005 | — | Remainder | 1.7 | ○ |

|  | Plating property | Plating rate | Young's modulus E (GPa) | Density ρ (g/cm³) | E/ρ | Fluttering characteristics |
| --- | --- | --- | --- | --- | --- | --- |
| Example 1 | ○ | ○ | 97 | 2.60 | 37.3 | B |
| Example 2 | Δ | ○ | 99 | 2.62 | 37.8 | B |
| Example 3 | ○ | ○ | 95 | 2.58 | 36.8 | B |
| Example 4 | ○ | ○ | 97 | 2.62 | 37.1 | B |
| Example 5 | Δ | ○ | 97 | 2.57 | 37.8 | B |
| Example 6 | ○ | ○ | 97 | 2.60 | 37.3 | B |
| Example 7 | Δ | ○ | 97 | 2.60 | 37.3 | B |
| Example 8 | ○ | ○ | 97 | 2.62 | 37.0 | B |
| Example 9 | ○ | ○ | 97 | 2.60 | 37.3 | B |
| Example 10 | ○ | ○ | 97 | 2.60 | 37.3 | B |
| Example 11 | ○ | ○ | 97 | 2.60 | 37.3 | B |
| Example 12 | ○ | ○ | 97 | 2.60 | 37.3 | B |

TABLE 1-continued

| | | | | | | |
|---|---|---|---|---|---|---|
| Example 13 | ○ | ○ | 97 | 2.60 | 37.3 | B |
| Example 14 | ○ | ○ | 97 | 2.60 | 37.3 | B |
| Example 15 | ○ | ○ | 97 | 2.60 | 37.3 | B |
| Example 16 | ○ | ○ | 97 | 2.60 | 37.3 | B |
| Comparative Example 1 | x | ○ | 100 | 2.63 | 38.1 | B |
| Comparative Example 2 | ○ | ○ | 94 | 2.61 | 36.0 | D |
| Comparative Example 3 | ○ | ○ | 97 | 2.65 | 36.7 | B |
| Comparative Example 4 | x | ○ | 96 | 2.55 | 37.6 | B |
| Comparative Example 5 | ○ | ○ | 97 | 2.60 | 37.4 | B |
| Comparative Example 6 | x | ○ | 96 | 2.60 | 36.9 | B |
| Comparative Example 7 | ○ | ○ | 96 | 2.64 | 36.4 | D |
| Comparative Example 8 | ○ | x | 97 | 2.60 | 37.3 | B |

Comparative Example 1 was a specimen in which the content of Si was set to be above the desirable range and was found to be poor in terms of the workability and the plating property. This is because the content of Si was above the desirable range, and thus the primary-crystal Si particles excessively grew, which affected the result of the plating property being poor.

Comparative Example 2 was a specimen in which the content of Si was set to be below the desirable range and was found to be poor in terms of the fluttering characteristics. In other words, the maximum value of the obtained widths of displacement is too large. This is considered to be because the content of Si was below the desirable range, and the Young's modulus E became too low.

Comparative Example 3 was a specimen in which the content of Cu was set to be above the desirable range and was found to be poor in terms of the workability. In a case in which the content of Cu was too large, the ductility of the Al alloy degraded, and thus a problem of the material being stuck in the device during the extrusion in the extrusion device was caused.

Comparative Example 4 was a specimen in which the content of Cu was set to be below the desirable range and was found to be poor in terms of the workability. Cu contributes to the precipitation of Cu—Si; however, in a case in which the content of Cu is small, the amount of Si included in the Al alloy matrix increases, and thus the primary-crystal Si particles grow and coarsen, and thus the workability and the plating property become poor.

Comparative Example 5 was a specimen in which the content of Mg was set to be above the desirable range and was found to be poor in terms of the workability. In a case in which the content of Mg was too large, the ductility of the Al alloy degraded, and thus a problem of the material being stuck in the device during the extrusion in the extrusion device was caused.

Comparative Example 6 was a specimen in which the content of Mg was set to be below the desirable range and was found to be poor in terms of the workability. In a case in which the content of Mg is small, the primary-crystal Si particles grow and coarsen, and thus the workability and the plating property become poor.

Comparative Example 7 was a specimen in which the content of Zn was set to be above the desirable range and was found to have an excessively high density and be poor in terms of the fluttering characteristics.

Comparative Example 8 was a specimen in which the content of Zn was set to be below the desirable range, and a problem of the plating rate being excessively low was caused.

In contrast to these comparative examples, in Examples 1 to 16 including Si, Cu, and Mg in the ranges of the present invention, the average particle diameters of the primary-crystal Si particles were 2 μm or less in the obtained aluminum alloy substrates, and the substrates for a magnetic recording medium produced using the above-described aluminum alloy substrates were improved in terms of both the plating property and the fluttering characteristics.

In addition, the obtained magnetic recording media did not easily allow the generation of scratches even when machined and were excellent in terms of the workability. In addition, in the obtained magnetic recording media, it could be confirmed that the Young's modulus were as high as 95 to 99 GPa, the densities were as low as a range of 2.57 to 2.62 $g/m^3$, and the values of E/ρ (E: Young's modulus, ρ: density) were 36.5 or more.

EXPLANATION OF REFERENCES

1 . . . SUBSTRATE FOR MAGNETIC RECORDING MEDIUM,
3 . . . Al ALLOY MATRIX,
4 . . . PRIMARY-CRYSTAL Si PARTICLE,
11 . . . ALUMINUM ALLOY SUBSTRATE,
12 . . . NiP-BASED PLATING COAT,
20 . . . POLISHING MACHINE,
21, 22 . . . PRESS PLATEN,
23 . . . POLISHING PAD,
30 . . . POWDER PARTICLE,
31 . . . MAGNETIC RECORDING MEDIUM,
32 . . . MAGNETIC LAYER,
33 . . . PROTECTIVE LAYER,
34 . . . LUBRICANT LAYER,
40 . . . HARD DISC DRIVE,
41 . . . MEDIUM-DRIVING PORTION,
42 . . . MAGNETIC HEAD,
43 . . . HEAD-MOVING PORTION,
44 . . . RECORD REPLAY SIGNAL-PROCESSING PORTION

What is claimed is:

1. An aluminum alloy substrate for a magnetic recording medium, having
   a metallic structure made of an Al alloy which has a composition including Si in a range of 28.0% by mass to 32.0% by mass, Cu in a range of 2.5% by mass to 4.0% by mass, and Mg in a range of 0.8% by mass to 1.5% by mass with a remainder being Al,
   wherein primary-crystal Si particles which have a maximum diameter of 0.5 μm or more and an average particle diameter of 2 μm or less are dispersed in the metallic structure,
   a diameter of the substrates is in a range of 53 mm to 97 mm, and a thickness of the substrates is in a range of 0.2 mm to 0.9 mm, and
   a value of $E/\rho$ (E: Young's modulus, $\rho$: density) is 36.5 $(GPa)/(g/cm^3)$ or more.

2. The aluminum alloy substrate for a magnetic recording medium according to claim 1,
   wherein the Al alloy further includes Zn in a range of 0.01% by mass to 0.5% by mass.

3. The aluminum alloy substrate for a magnetic recording medium according to claim 1,
   wherein the Al alloy further includes one or more of Mn, Ti, Cr, V, Zr, Mo, and Co in a range of 0.01% by mass to 0.5% by mass.

4. The aluminum alloy substrate for a magnetic recording medium according to claim 1,
   wherein the metallic structure is an extruded structure of a powder particle compact of the Al alloy.

5. A substrate for a magnetic recording medium, comprising:
   an aluminum alloy substrate; and
   a NiP-based plating coat formed on at least one surface of the aluminum alloy substrate,
   wherein the aluminum alloy substrate is the aluminum alloy substrate for a magnetic recording medium according to claim 1.

6. A magnetic recording medium comprising:
   a substrate for a magnetic recording medium; and
   a magnetic layer provided on a surface of the substrate for a magnetic recording medium,
   wherein the substrate for a magnetic recording medium is the substrate for a magnetic recording medium according to claim 5, and
   the magnetic layer is provided on the surface of the substrate for a magnetic recording medium on which the NiP-based plating coat is formed.

7. A hard disc drive equipped with a magnetic recording medium,
   wherein the magnetic recording medium is the magnetic recording medium according to claim 6.

8. A method for manufacturing an aluminum alloy substrate for a magnetic recording medium according to claim 1, the method comprising:
   forming a compact of powder particles made of an Al alloy having a composition including Si in a range of 28.0% by mass to 32.0% by mass, Cu in a range of 2.5% by mass to 4.0% by mass, and Mg in a range of 0.8% by mass to 1.5% by mass with a remainder being Al;
   extruding this compact to form a cylindrical body; and
   cutting this cylindrical body to obtain a disc-shaped aluminum alloy substrate for a magnetic recording medium from the cylindrical body.

9. The method for manufacturing an aluminum alloy substrate for a magnetic recording medium according to claim 8,
   wherein the Al alloy further includes Zn in a range of 0.01% by mass to 0.5% by mass.

10. The method for manufacturing an aluminum alloy substrate for a magnetic recording medium according to claim 8,
    wherein the Al alloy further includes one or more of Mn, Ti, Cr, V, Zr, Mo, and Co in a range of 0.01% by mass to 0.5% by mass.

11. The method for manufacturing an aluminum alloy substrate for a magnetic recording medium according to claim 8,
    wherein primary-crystal Si particles having a maximum diameter of 0.5 μm or more and an average particle diameter of 2 μm or less are dispersed.

12. The aluminum alloy substrate for a magnetic recording medium according to claim 1, wherein the Al alloy including Si in a range of 29.0% by mass to 31.5% by mass, Cu in a range of 3.0% by mass to 3.8% by mass, and Mg in a range of 1.0% by mass to 1.4% by mass with a remainder being Al.

* * * * *